US011433827B2

(12) United States Patent
Singh et al.

(10) Patent No.: US 11,433,827 B2
(45) Date of Patent: Sep. 6, 2022

(54) BRACKET ASSEMBLY FOR SECURING A SAFETY EQUIPMENT MODULE TO A WINDOWPANE OF A VEHICLE

(71) Applicant: Volvo Car Corporation, Gothenburg (SE)

(72) Inventors: Aakash Narender Singh, Gothenburg (SE); Oscar Rovira, Gothenburg (SE); Eirini Chatzopoulou, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 328 days.

(21) Appl. No.: 16/434,599

(22) Filed: Jun. 7, 2019

(65) Prior Publication Data

US 2020/0384930 A1 Dec. 10, 2020

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2011/0059* (2013.01)

(58) Field of Classification Search
CPC ............. B60R 11/04; B60R 2011/0026; B60R 2011/0059; B60R 2011/0071; B60J 1/02
USPC ........................................................ 248/208
See application file for complete search history.

(56) References Cited

U.S. PATENT DOCUMENTS

| 8,944,705 | B1* | 2/2015 | Matori | F16M 13/00 |
| | | | | 396/419 |
| 9,487,156 | B2* | 11/2016 | Frenzel | B60R 11/02 |
| 9,511,719 | B2 | 12/2016 | Krug et al. | |
| 10,139,707 | B2 | 11/2018 | Carlson | |
| 10,220,799 | B2* | 3/2019 | Kasai | H04N 5/2252 |
| 10,232,798 | B2 | 3/2019 | Gunes | |
| 10,471,906 | B2* | 11/2019 | Kasai | B60R 11/04 |
| 10,676,040 | B2* | 6/2020 | Naoi | B60R 11/04 |
| 11,040,671 | B2* | 6/2021 | Yamamoto | H04N 5/2257 |
| 2011/0233248 | A1 | 9/2011 | Flemming et al. | |
| 2012/0207461 | A1* | 8/2012 | Okuda | B60R 11/04 |
| | | | | 396/419 |

(Continued)

FOREIGN PATENT DOCUMENTS

DE 102011121003 A1 6/2013

*Primary Examiner* — Nkeisha Smith
(74) *Attorney, Agent, or Firm* — Clements Bernard Walker; Christopher L. Bernard

(57) ABSTRACT

An improved bracket assembly for securing a safety equipment module, such as a forward-facing camera and/or other sensor module, to the interior surface of a windshield or other windowpane of a vehicle. The bracket assembly includes a planar bracket member including an exterior surface that is adhered or otherwise affixed to the interior surface of the windowpane. The bracket member defines a port through which the safety equipment module is provided visibility to the exterior of the vehicle through the windowpane. The bracket member includes a central spring-loaded, self-orienting clip structure that is adapted to receive a corresponding post structure coupled to a top, central portion of the safety equipment module. The bracket member also includes a pair of opposed side spring-loaded retention structures that are adapted to receive corresponding post or hook structures coupled to opposed side portions of the safety equipment module.

18 Claims, 7 Drawing Sheets

(56) References Cited

U.S. PATENT DOCUMENTS

| | | | | |
|---|---|---|---|---|
| 2015/0109447 | A1* | 4/2015 | Okuda | B60R 11/04 |
| | | | | 348/148 |
| 2016/0009230 | A1* | 1/2016 | Miyado | B60R 11/00 |
| | | | | 224/482 |
| 2016/0023620 | A1* | 1/2016 | Matori | B60R 11/04 |
| | | | | 348/148 |
| 2016/0229355 | A1* | 8/2016 | Hayashi | G01D 11/245 |
| 2017/0217382 | A1* | 8/2017 | Gunes | B60R 1/00 |
| 2017/0240120 | A1* | 8/2017 | Krug | H04N 5/2252 |
| 2017/0274834 | A1* | 9/2017 | Kasai | B60R 11/04 |
| 2017/0274835 | A1* | 9/2017 | Kasai | B60R 11/04 |
| 2017/0274836 | A1* | 9/2017 | Kasai | B60R 11/04 |
| 2017/0274837 | A1* | 9/2017 | Kasai | B60R 11/04 |
| 2017/0277020 | A1* | 9/2017 | Kasai | G03B 17/561 |
| 2018/0154842 | A1* | 6/2018 | Naoi | B60R 11/04 |
| 2018/0316833 | A1* | 11/2018 | Okuda | B60R 11/04 |
| 2018/0361947 | A1* | 12/2018 | Matori | B60R 11/04 |
| 2018/0364076 | A1* | 12/2018 | Matori | G01D 11/30 |
| 2019/0168688 | A1* | 6/2019 | Yamamoto | G03B 17/02 |
| 2019/0193649 | A1* | 6/2019 | Kataishi | G03B 17/561 |
| 2019/0248301 | A1* | 8/2019 | Edgarian | B60R 11/04 |
| 2019/0308563 | A1* | 10/2019 | Fujiwara | B60R 11/04 |
| 2019/0315289 | A1* | 10/2019 | Okuda | B60R 11/04 |
| 2019/0344726 | A1* | 11/2019 | Granholm | B60R 11/04 |
| 2019/0351840 | A1* | 11/2019 | Kasarla | H04N 5/2257 |
| 2019/0375344 | A1* | 12/2019 | Kobayashi | G03B 17/55 |
| 2019/0381953 | A1* | 12/2019 | Ohsumi | G03B 11/045 |
| 2020/0047683 | A1* | 2/2020 | Kasai | H04N 5/2253 |
| 2020/0247330 | A1* | 8/2020 | Tokunaga | G03B 17/55 |
| 2020/0262361 | A1* | 8/2020 | Ueta | G03B 17/561 |
| 2020/0272032 | A1* | 8/2020 | Takenouchi | G03B 17/561 |
| 2020/0361398 | A1* | 11/2020 | Nakajima | B60R 13/04 |
| 2021/0031704 | A1* | 2/2021 | Lamoureux | B60R 11/04 |

* cited by examiner

BRACKET ASSEMBLY FOR SECURING A SAFETY EQUIPMENT MODULE TO A WINDOWPANE OF A VEHICLE

TECHNICAL FIELD

The present disclosure relates generally to the automotive and safety equipment fields. More particularly, the present disclosure relates to a bracket assembly for securing a safety equipment module to a windowpane of a vehicle and windshield incorporating such a bracket assembly.

BACKGROUND

In modern vehicles, it is common to secure a safety equipment module to the upper interior surface of the windshield, generally behind the rear-view mirror console. Such safety equipment module may include a forward-facing camera and/or other sensors, which is/are then provided desired visibility through the windshield. Typically, the safety equipment module is screwed or otherwise rigidly affixed around its periphery to a bracket member that is first adhered or otherwise rigidly affixed to the interior surface of the windshield. Such rigid attachment mechanism is somewhat complex and expensive, is often difficult to manipulate in an installation or after-market operation (where access may be limited), and provides limited component protection during an impact event. Thus, an improved attachment mechanism is needed in the art for securing a safety equipment module to the interior surface of a windshield or other windowpane of a vehicle.

SUMMARY

In various exemplary embodiments, the present disclosure provides an improved bracket assembly for securing a safety equipment module, such as a forward-facing camera and/or other sensor module, to the interior surface of a windshield or other windowpane of a vehicle. The bracket assembly includes a planar bracket member including an exterior surface that is adhered or otherwise affixed to the interior surface of the windowpane. The bracket member defines a port through which the safety equipment module is provided visibility to the exterior of the vehicle through the windowpane. The bracket member generally includes a central spring-loaded, self-orienting clip structure that is adapted to receive a corresponding post structure coupled to a top, central portion of the safety equipment module, for example. This clip structure orients the safety equipment module with respect to the bracket member and the windowpane and biases the safety equipment module towards the bracket member and the windowpane. The bracket member also generally includes a pair of opposed side spring-loaded retention structures that are adapted to receive corresponding post or hook structures coupled to opposed side portions of the safety equipment module, for example. These retention structures also orient the safety equipment module with respect to the bracket member and the windowpane and allow the safety equipment module to be pressed against the bracket member and secured to the bracket member and the windowpane by allowing gravity to pull the safety equipment module downwards into the retention structures, where the post or hook structures are held by the associated spring members.

It will be readily apparent to those of ordinary skill in the art that this attachment mechanism can be applied to any windowpane and any type of safety equipment module associated with a vehicle. Further, any number and configuration of clip structures, retention structures, and post structures can be utilized, provided that the methods of operation are similar to those described herein.

In one exemplary embodiment, the present disclosure provides a bracket assembly for securing a safety equipment module to a windowpane of a vehicle, the bracket assembly including: a planar bracket member having an interior surface and an exterior surface adapted to be secured to an interior surface of the windowpane; a clip structure coupled to the interior surface of the planar bracket member and adapted to receive and retain a post structure coupled to the safety equipment module; and a pair of opposed retention structures coupled to the interior surface of the planar bracket member and adapted to receive and retain a pair of opposed post or hook structures coupled to the safety equipment module. Optionally, the exterior surface of the planar bracket member is adapted to be secured to the interior surface of the windowpane using an adhesive. The clip structure includes a resilient spring member adapted to retain the post structure coupled to the safety equipment module and bias the post structure towards the planar bracket member and the interior surface of the windowpane. The clip structure includes a pair of opposed strut structures adapted to align the post structure coupled to the safety equipment module with respect to the planar bracket member. Each of the pair of opposed retention structures includes a resilient spring member adapted to bias the respective post or hook structure coupled to the safety equipment module away from the planar bracket member and the interior surface of the windowpane and into a lip structure of the retention structure. The bracket member defines a recess adapted to align the post structure coupled to the safety equipment module with respect to the planar bracket member. The post structure is coupled to a top, central portion of the safety equipment module. Each of the pair of opposed post or hook structures is coupled to a side portion of the safety equipment module.

In another exemplary embodiment, the present disclosure provides a windshield assembly for a vehicle, the windshield assembly including: a windowpane having an interior surface; a planar bracket member having an interior surface and an exterior surface secured to the interior surface of the windowpane; a clip structure coupled to the interior surface of the planar bracket member and adapted to receive and retain a post structure coupled to the safety equipment module; and a pair of opposed retention structures coupled to the interior surface of the planar bracket member and adapted to receive and retain a pair of opposed post or hook structures coupled to the safety equipment module. Optionally, the exterior surface of the planar bracket member is secured to the interior surface of the windowpane using an adhesive. The clip structure includes a resilient spring member adapted to retain the post structure coupled to the safety equipment module and bias the post structure towards the planar bracket member and the interior surface of the windowpane. The clip structure includes a pair of opposed strut structures adapted to align the post structure coupled to the safety equipment module with respect to the planar bracket member. Each of the pair of opposed retention structures includes a resilient spring member adapted to bias the respective post or hook structure coupled to the safety equipment module away from the planar bracket member and the interior surface of the windowpane and into a lip structure of the retention structure. The bracket member defines a recess adapted to align the post structure coupled to the safety equipment module with respect to the planar bracket member. The post structure is coupled to a top, central portion of the safety equipment module. Each of the pair of opposed post or hook structures is coupled to a side portion of the safety equipment module.

In a further exemplary embodiment, the present disclosure provides a safety equipment module adapted to be secured to a windowpane of a vehicle, the safety equipment module including: a housing; a post structure coupled to the housing and adapted to be received and retained by a clip structure coupled an interior surface of a planar bracket member secured to an interior surface of the windowpane; and a pair of opposed post or hook structures coupled to the housing and adapted to be received and retained by a pair of opposed retention structures coupled to the interior surface of the planar bracket member secured to the interior surface of the windowpane. The safety equipment module of claim includes one or more of a camera device and a sensor device disposed within the housing. The post structure is coupled to a top, central portion of the housing. Each of the pair of opposed post or hook structures is coupled to a side portion of the housing.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EMBODIMENTS

Again, the present disclosure provides an improved bracket assembly for securing a safety equipment module, such as a forward-facing camera and/or other sensor module, to the interior surface of a windshield or other windowpane of a vehicle. The bracket assembly includes a planar bracket member including an exterior surface that is adhered or otherwise affixed to the interior surface of the windowpane. The bracket member defines a port through which the safety equipment module is provided visibility to the exterior of the vehicle through the windowpane. The bracket member generally includes a central spring-loaded, self-orienting clip structure that is adapted to receive a corresponding post structure coupled to a top, central portion of the safety equipment module, for example. This clip structure orients the safety equipment module with respect to the bracket member and the windowpane and biases the safety equipment module towards the bracket member and the windowpane. The bracket member also generally includes a pair of opposed side spring-loaded retention structures that are adapted to receive corresponding post or hook structures coupled to opposed side portions of the safety equipment module, for example. These retention structures also orient the safety equipment module with respect to the bracket member and the windowpane and allow the safety equipment module to be pressed against the bracket member and secured to the bracket member and the windowpane by allowing gravity to pull the safety equipment module downwards into the retention structures, where the post or hook structures are held by the associated spring members.

It will be readily apparent to those of ordinary skill in the art that this attachment mechanism can be applied to any windowpane and any type of safety equipment module associated with a vehicle. Further, any number and configuration of clip structures, retention structures, and post structures can be utilized, provided that the methods of operation are similar to those described herein.

Figure 1:
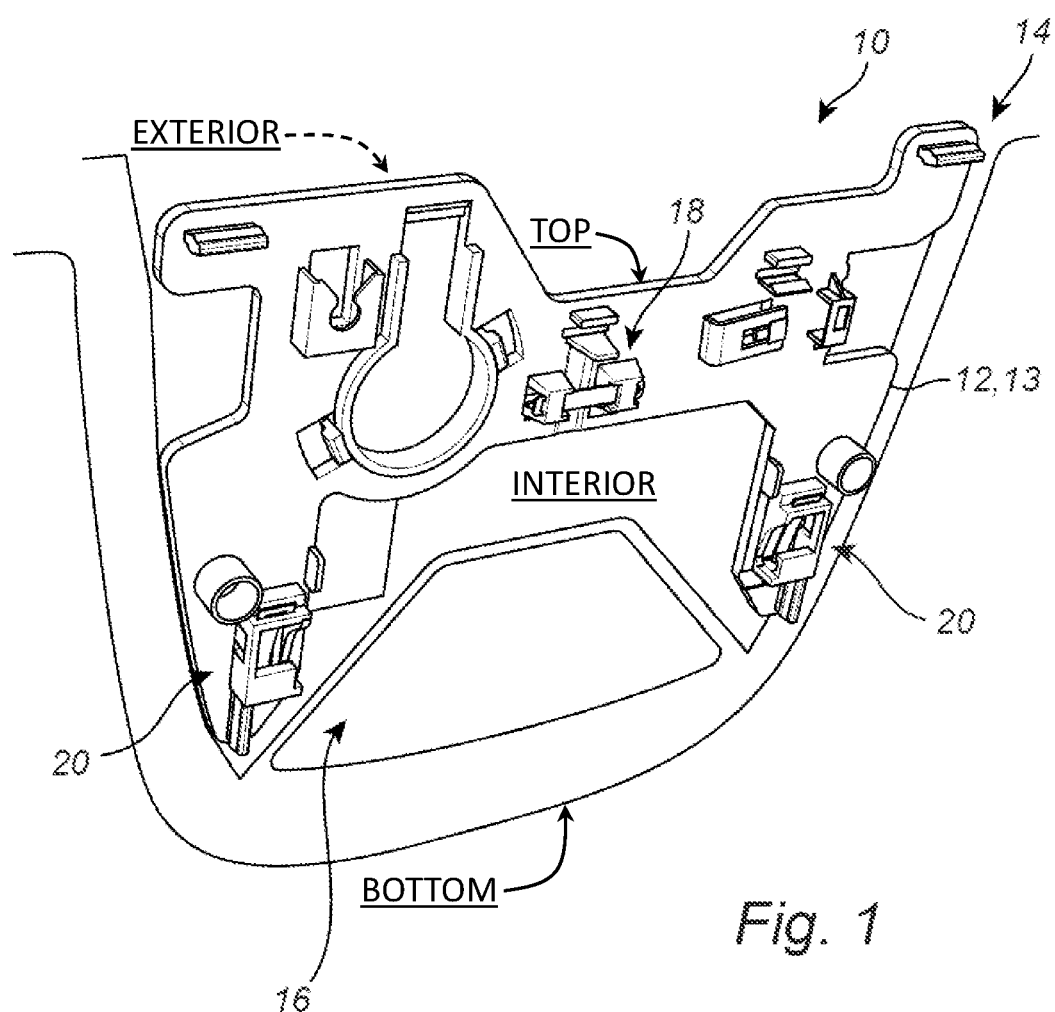
FIG. 1 is a perspective view of one exemplary embodiment of the bracket assembly of the present disclosure adhered or otherwise affixed to the windshield of a vehicle.

Referring now specifically to FIG. 1, in one exemplary embodiment, the bracket assembly 10 includes the bracket member 12, which consists of a rigid or semi-rigid planar structure 13, such as a plastic planar structure, including an interior surface and an exterior surface. The exterior surface of the planar structure 13 is adhered to an interior surface of a windowpane 14, such as the upper central portion of a windshield, using an adhesive, for example. A variety of mechanical fasteners can also be used to achieve this securement. The bracket member 12 has a shape that substantially conforms to the shape of a rear-view mirror console or the like that preferably covers the bracket member 12 within the interior of the vehicle. In the exemplary embodiment illustrated, the bracket member 12 has a substantially upside-down trapezoidal shape with rounded edges and corners, although any suitable shape may be utilized.

In general, the interior surface of the planar structure 13 is adapted to receive and retain a safety equipment module, such as a forward-facing camera and/or sensor module or the like. Accordingly, the bracket member 12 defines a cut-out or port 16 through which the forward-facing camera and/or sensor is provided with visibility to the exterior of the vehicle through the windowpane 14. It should be noted that the bracket member 12 may include any number and configuration of connections points for coupling various components to the bracket member 12 and, optionally, providing visibility to the exterior of the vehicle through the windowpane 14. Most of these components and connection points are not described in detail herein. Further, the bracket member 12 may include any number and configuration of attachment points for coupling the rear-view mirror console or the like to the bracket member 12. These attachments point are also not described in detail herein.

Importantly, the bracket member 12 includes a thin planar structure 13 that is attachable to a windowpane and generally includes a clip structure 18 and a pair of opposed retention structures 20 that are collectively operable for receiving, aligning, and securing the safety equipment module with respect to the bracket member 12 and the windowpane 14, as is described in greater detail herein below. This arrangement of an upper central clip structure 18 and opposed side retention structures 20 is exemplary only, and other arrangements can be used equally, provided the same operational principles apply. The arrangement provides for the use of a readily installable and removable safety equipment module with a window-mounted bracket assembly 10.

Figure 2:
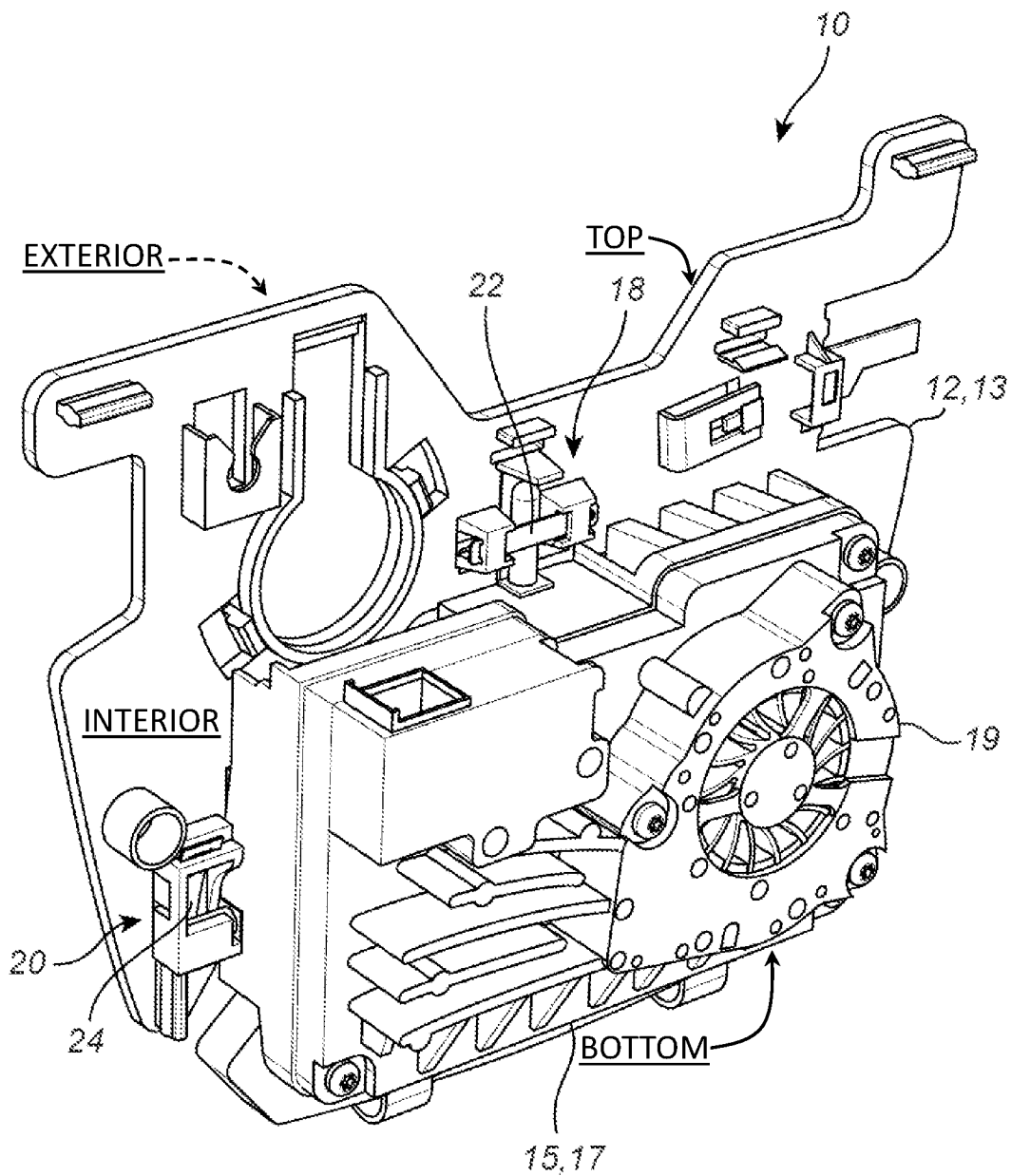
FIG. 2 is a perspective view of one exemplary embodiment of the bracket assembly of the present disclosure with a safety equipment module secured thereto.
Figure 3:
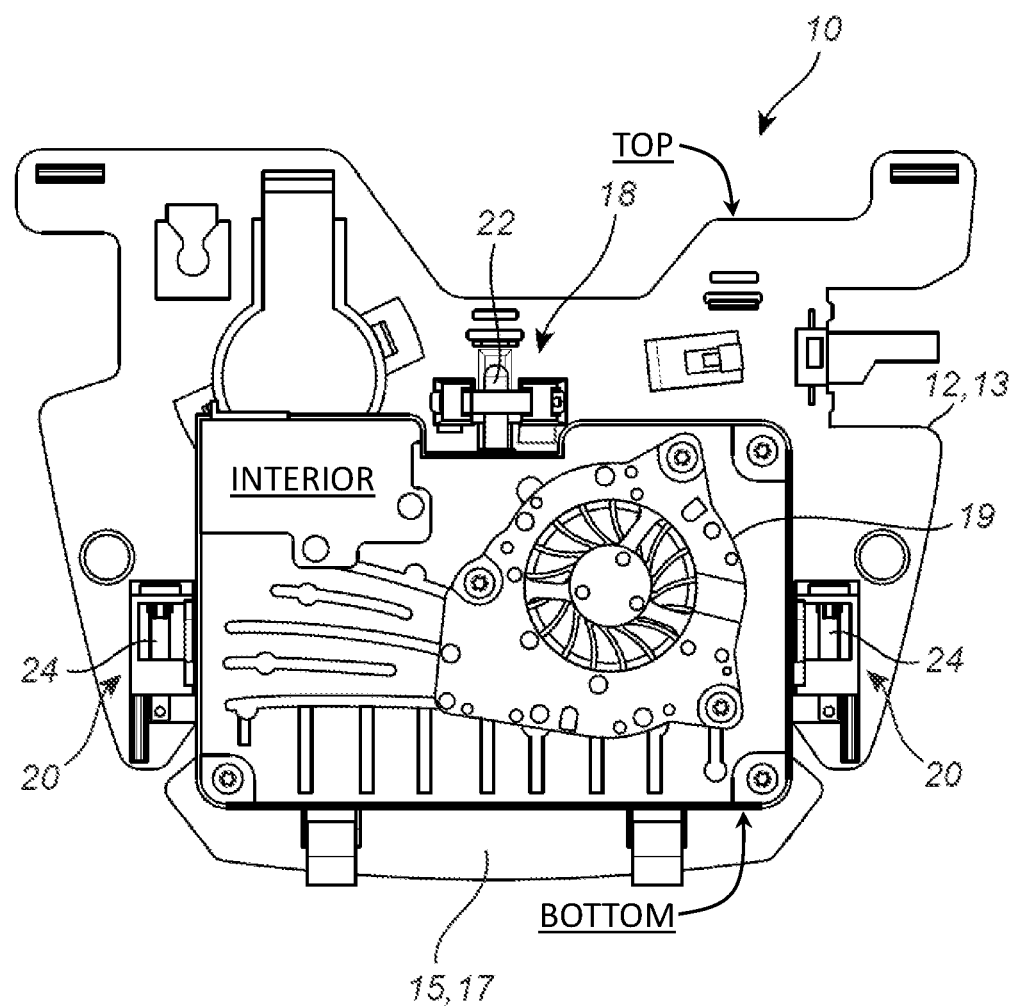
FIG. 3 is a planar view of one exemplary embodiment of the bracket assembly of the present disclosure with a safety equipment module secured thereto.

Referring now specifically to FIGS. 2 and 3, the safety equipment module 15 is shown secured to the bracket member 12. Here, the safety equipment module 15 consists of a forward-facing camera module including a rigid housing 17 containing a camera device with visibility through the exterior side of the housing 17 and cooled by a fan assembly 19 that is vented through the interior side of the housing 17 into the rear-view mirror console, for example. The housing 17 also contains other camera components, including electronics, electrical connection, etc. Other sensor modules will be similarly configured. Typically, the camera module housing 17 is made of plastic or metal.

Here, the safety equipment module 15 includes an upper central post structure 22 that is adapted to engage the clip structure 18 of the bracket member 12 and a pair of opposed side post or hook structures 24 that are adapted to engage the respective retention structures 20 of the bracket member 12, thereby removably securing the safety equipment module 15 to the bracket member 12. The central post structure 22 and the side post or hook structures 24 may be made of a rigid plastic or metal material integrally formed with the camera module housing 17, a metallic material coupled to the camera module housing 17, or the like. It should be noted that the bracket assembly 10 is typically "pre-mounted" to the windshield 14, while the safety equipment module 15 is typically secured to the bracket assembly 10 after the windshield 14 and bracket assembly 10 have been installed together in the vehicle, all with the rear-view mirror console or the like removed. Here, the central post structure 22 consists of a "peg" that has a substantially circular cross-sectional shape and the side post or hook structures 24 consist of either "pegs" that have substantially circular or oval cross-sectional shapes or elongated "hooks" or "tabs" that substantially conform to and are translatable within the openings defined by the side retention structures 20. When installed, the safety equipment module 15 may sit substantially flush with the bracket member 12, or the safety equipment module 15 may sit slightly spaced-apart from the bracket member 12, optionally at a slight upwards or downwards angle.

Figure 4:
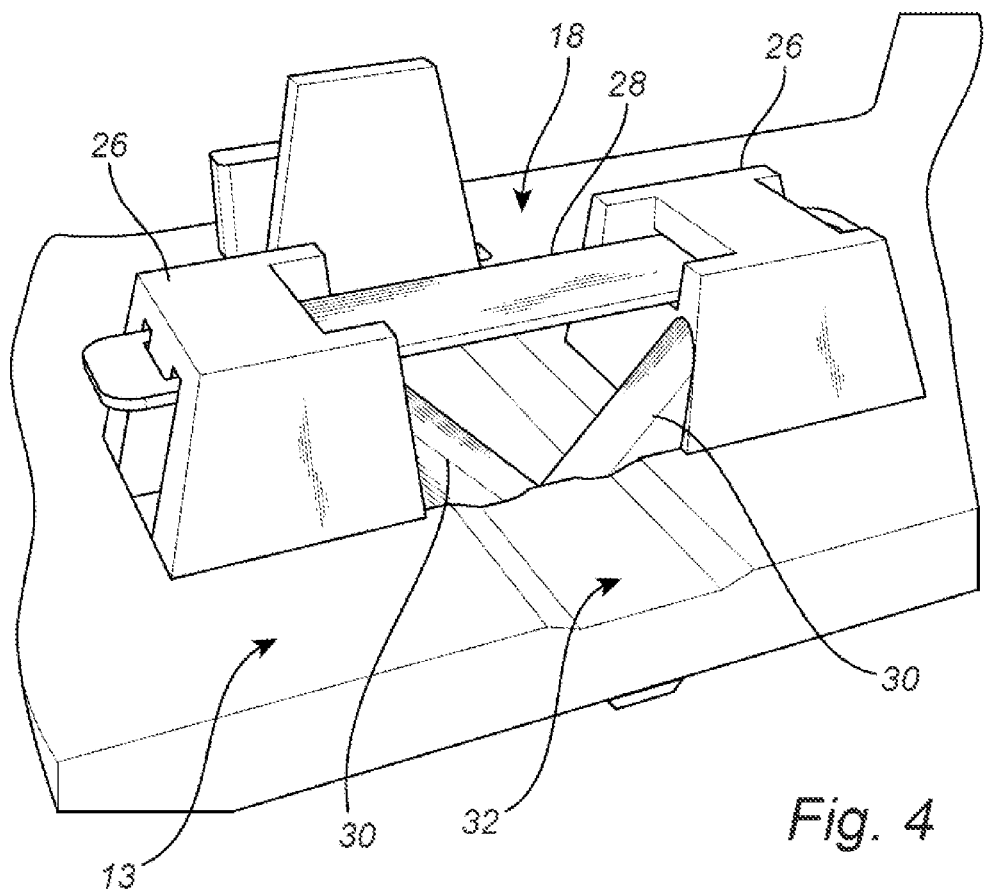
FIG. 4 is a perspective view of one exemplary embodiment of a clip structure of the bracket assembly of the present disclosure.
Figure 5:
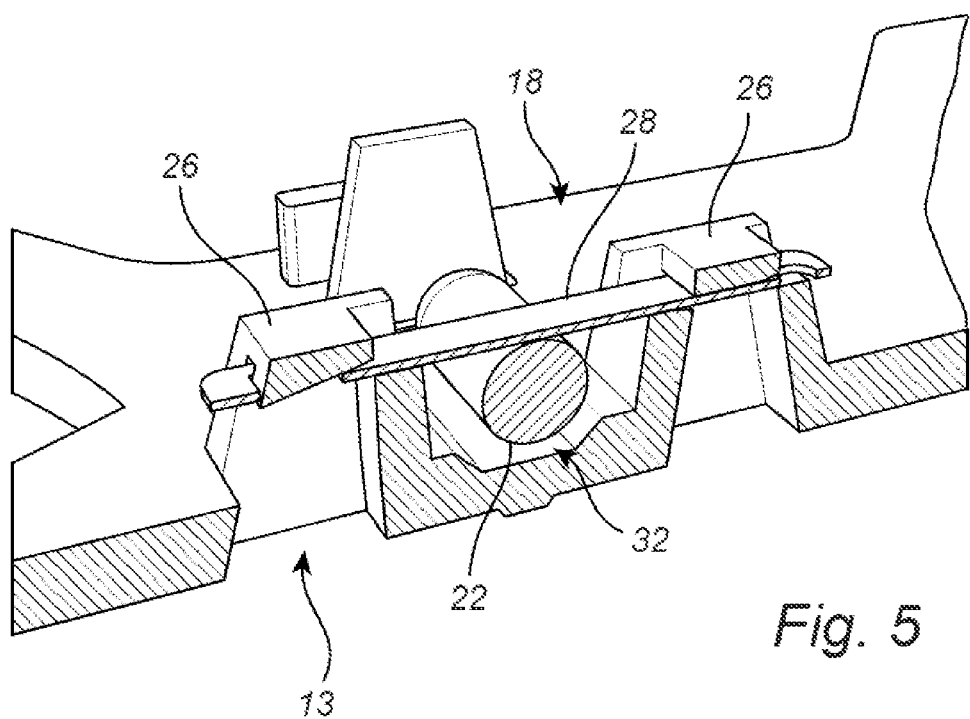
FIG. 5 is a planar view of one exemplary embodiment of a clip structure of the bracket assembly of the present disclosure with a corresponding post structure of a safety equipment module coupled thereto.

Referring now specifically to FIGS. 4 and 5, in one exemplary embodiment, the central clip structure 18 includes a pair of support structures 26 that protrude above the interior surface of the planar structure 13 and are adapted to support a spanning spring member 28 that is manufactured from a resilient metal or plastic. Each of the pair of support structures 26 consists of a protruding arm or box-like structure and defines a slot adapted to receive a respective end of the spring member 28. A pair of strut members 30 (FIG. 4) are disposed between the support structures 26 and form a generally V-shaped structure with an intersection point disposed adjacent to the interior surface of the planar structure 13. This V-shaped structure may provide a spring force as well. Collectively, the strut members 30 are configured to align and carry the central post structure 22 (FIG. 5) of the safety equipment module 15 and the spring member 28 is configured to retain the central post structure 22 and bias it towards the planar structure 13 when the central post structure 22 is disposed between the strut members 30 and the spring member 28. The strut members 30 may be independent components or they may be integrally formed with the planar structure 13 and/or support structures 26.

In this exemplary embodiment, the spring member 28 consists of a simple planar tab structure, which optionally includes a deflectable locking tab or the like, and the central post structure 22 is guided into the receptacle formed with the assistance of an elongate recess 32 manufactured into the interior surface of the planar structure 13. The spring member 28 spans the space between the two support structures 26, and optionally passes through a slot that is formed near the top of each.

It will be ready apparent those of ordinary skill in the art that other clip mechanisms could be utilized equally. For example, the central post structure 22 need not have a substantially circular or oval cross-sectional shape, as illustrated, and the central clip structure 18 could simply consist of an enclosed pocket structure adapted to receive the central post structure 22, optionally containing a resilient annular structure suitable for retaining the central post structure 22 and providing a similar cushioning/spring force. The exemplary embodiment illustrated has the advantage of guiding the central post structure 22 into proper alignment, especially under limited access installation conditions, due to the use of the strut members 30 and elongate recess 32. Here, the "pocket" structure is formed by the support structures 26 and the spanning spring member 28.

Figure 6:
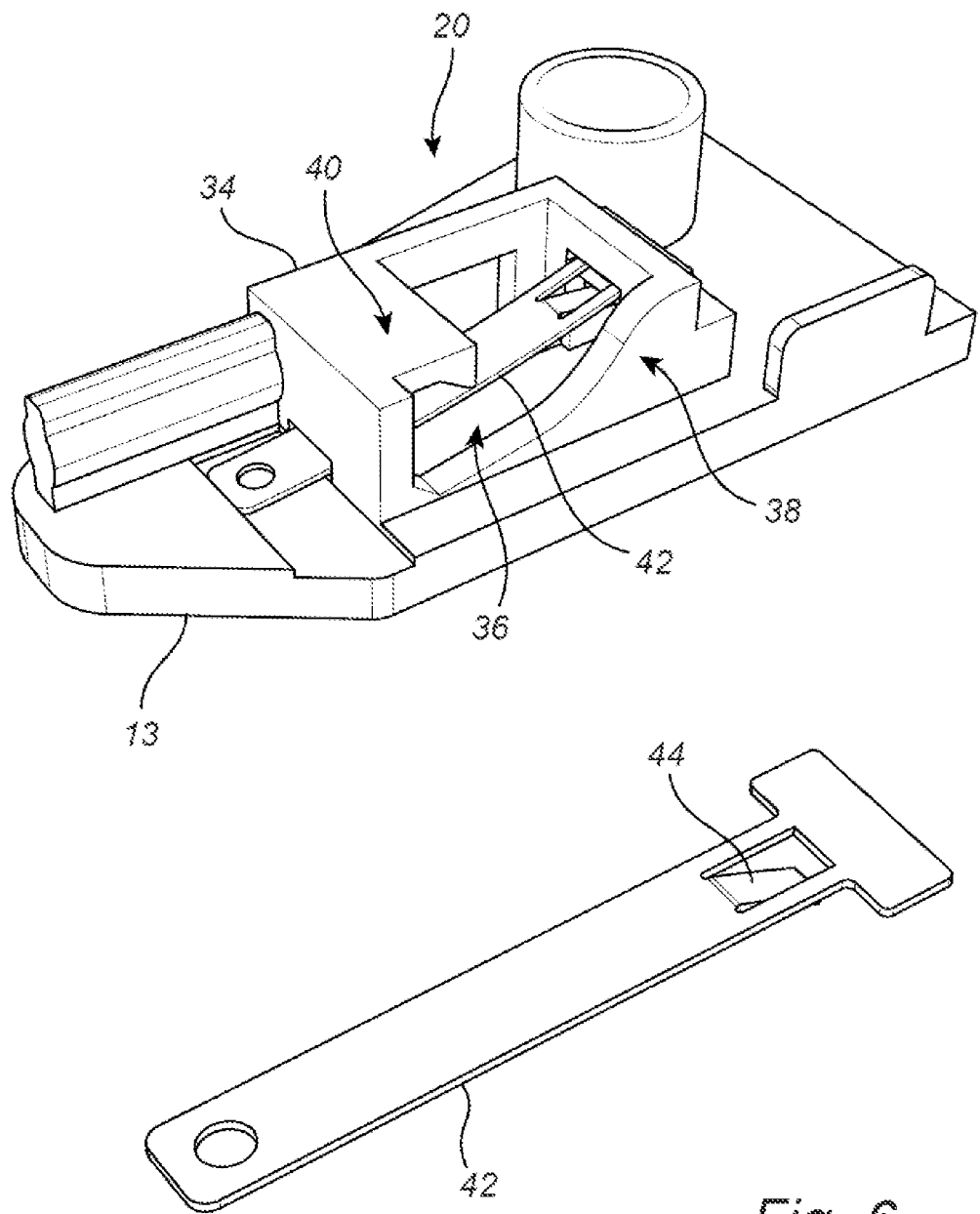
FIG. 6 is a perspective view of one exemplary embodiment of a retention structure of the bracket assembly of the present disclosure, along with one exemplary embodiment of an associated spring member.
Figure 7:
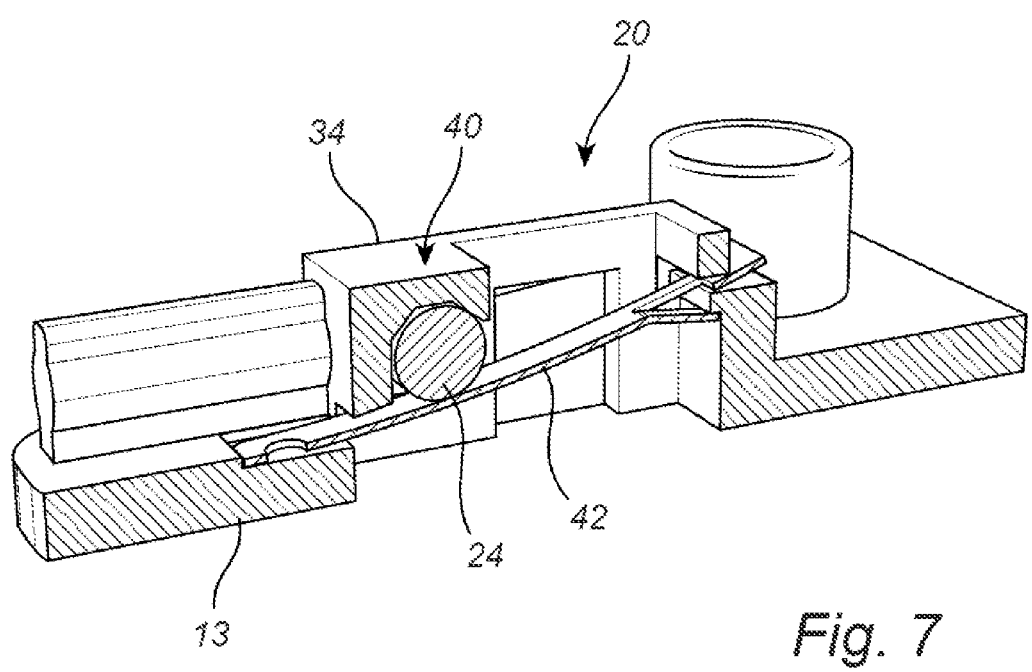
FIG. 7 is a planar view of one exemplary embodiment of a retention structure of the bracket assembly of the present disclosure with a corresponding post or hook structure of a safety equipment module coupled thereto.

Referring now specifically to FIGS. 6 and 7, in one exemplary embodiment, the side retention structures 20 each include a prismatic slot structure 34 that protrudes from the interior surface of the planar structure 13. The slot structure 34 forms a box-like structure having a partially-open inboard side 36 (FIG. 6), the partially-open inboard side 36 including a curved ramp structure 38 (FIG. 6). This curved ramp structure 38 is configured to receive the post or hook structure 24 (FIG. 7) protruding from the respective side of the safety equipment module 15 (FIGS. 2 and 3) near the top or middle portion of the slot structure 34 and guide the post or hook structure 24 smoothly into the bottom portion of the slot structure 34 by the action of gravity and/or an applied force, where the post or hook structure 24 engages and is retained by a lip structure 40 forming part of the interior side of the slot structure 34, which may be otherwise open or fully enclosed. Thus, the post or hook structure 24 is securely retained in the bottom portion of the slot structure 34.

A spring member 42 that is manufactured from a resilient metal or plastic is disposed diagonally across the space formed within the slot structure 34, substantially coincident with the curved ramp structure 38 and held in place via a deflectable locking tab 44 or the like. The post or hook structure 24 engages this spring member 42 as it is inserted into the slot structure 34 and translated along the curved ramp structure 38 until it comes to rest in the bottom portion of the slot structure 34 and against the lip structure 40, at which point the spring member 42 serves to bias the post or hook structure 24 within the bottom portion of the slot structure 34 and against the lip structure 40. This biasing provides tactile feedback during installation of the safety equipment module 15 and helps hold the safety equipment module 15 secure in the event of a minor frontal vehicle impact event or the like. In this exemplary embodiment, the spring member 42 includes an elongate tab structure, optionally with a widened end portion, that is disposed through a slot manufactured into each of the top and bottom portion of the slot structure 34. The top slot may be disposed farther away from the planar structure 13 than the bottom slot, providing the spring member 42 with the desired diagonal orientation coincident with the curved ramp structure 38. When in place, the locking tab 44 prevents the spring member 42 from backing out of the slots.

It will be ready apparent those of ordinary skill in the art that other retention mechanisms could be utilized equally. For example, the side post or hook structures 24 need not each have a substantially circular or oval cross-sectional shape, as illustrated, and the side retention structures could each simply consist of a partially-enclosed hook structure adapted to receive the respective post or hook structure 24, optionally containing a resilient U-shaped structure suitable for retaining the respective post or hook structure 24 and providing a similar cushioning/spring force. The exemplary embodiment illustrated has the advantage of guiding the side post or hook structures 24 into proper alignment, especially under limited access installation conditions, due to the use of the curved ramp structures 38. The post or hook engaging portion of the lip structure 40 may include a concave or otherwise contoured interior surface that nests with the post or hook structure 24, when present.

Figure 8:
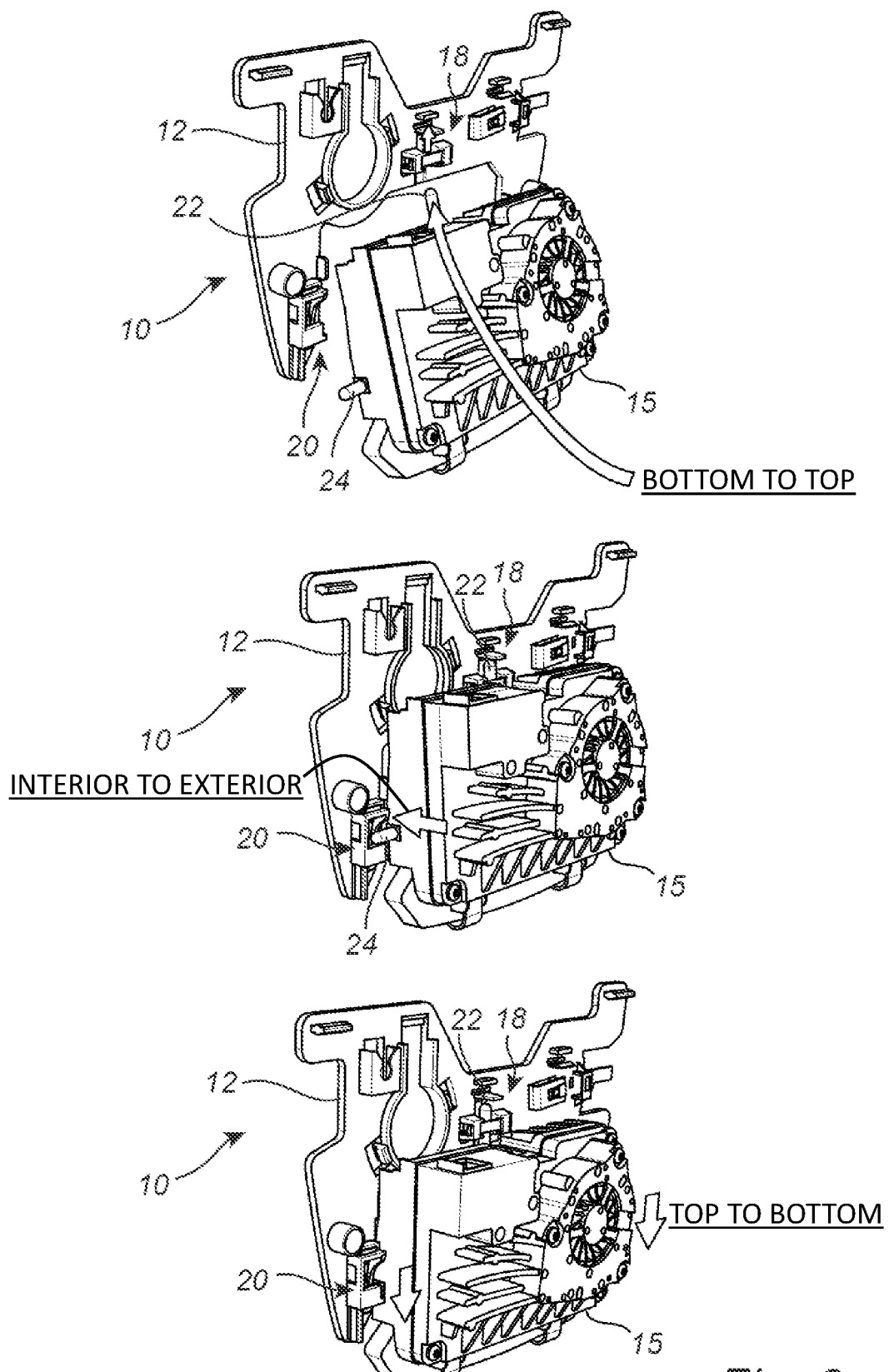
FIG. 8 is a perspective view of one exemplary embodiment of a sequential method of securing a safety equipment module to the bracket assembly of the present disclosure via first engagement of the central post structure of the safety equipment module with the central clip structure of the bracket member and second engagement of the side post or hook structures of the safety equipment module with the side retention structures of the bracket member.

Referring now specifically to FIG. 8, the safety equipment module 15 is assembled to the bracket member 12 of the bracket assembly 10 by first rotating the top portion of the safety equipment module 15 into the bracket member 12 and sliding the top, central post 22 of the safety equipment module 15 into the opening formed by the top, central clip structure 18 protruding from the bracket member 12. The side post or hook structures 24 of the safety equipment module 15 are then pressed into the openings defined by the side retention structures 24 protruding from the bracket member 12. The safety equipment module 15 is then allowed to translate downwards, by gravity and/or by being pressed. This causes the side post or hook structures 24 to translate downwards within and fully engage the side retention structures 20, thereby securing the safety equipment module 15 to the bracket member 10. An opposite procedure is used to disengage the safety equipment module 15 from the bracket member 12. As described in greater detail herein above, the top, central post structure 22 and the side post or hook structures 24 of the safety equipment module 15 are biased within the respective clip structure 18 and side retention structures 20 via the resilient spring mechanisms provided.

It should be noted that all components of the bracket assembly 10 can be manufactured from a plastic or metallic material, and all components can be integrally formed or otherwise coupled together.

Thus, again, the present disclosure provides an improved bracket assembly for securing a safety equipment module, such as a forward-facing camera and/or other sensor module, to the interior surface of a windshield or other windowpane of a vehicle. The bracket assembly includes a planar bracket member including an exterior surface that is adhered or otherwise affixed to the interior surface of the windowpane. The bracket member defines a port through which the safety equipment module is provided visibility to the exterior of the vehicle through the windowpane. The bracket member generally includes a central spring-loaded, self-orienting clip structure that is adapted to receive a corresponding post structure coupled to a top, central portion of the safety equipment module, for example. This clip structure orients the safety equipment module with respect to the bracket member and the windowpane and biases the safety equipment module towards the bracket member and the windowpane. The bracket member also generally includes a pair of opposed side spring-loaded retention structures that are adapted to receive corresponding post or hook structures coupled to opposed side portions of the safety equipment module, for example. These retention structures also orient the safety equipment module with respect to the bracket member and the windowpane and allow the safety equipment module to be pressed against the bracket member and secured to the bracket member and the windowpane by allowing gravity to pull the safety equipment module downwards into the retention structures, where the post or hook structures are held by the associated spring members.

It will be readily apparent to those of ordinary skill in the art that this attachment mechanism can be applied to any windowpane and any type of safety equipment module associated with a vehicle. Further, any number and configuration of clip structures, retention structures, and post structures can be utilized, provided that the methods of operation are similar to those described herein. In general, the clip structure and retention structures utilized herein form a 3-point, triangular attachment mechanism for mounting a camera housing to a window bracket. More attachment points could also be utilized, if desired.

It should be noted that, as used herein, "opposed" means "generally disposed across from" although not necessarily in a symmetrical configuration. Thus, two "opposed" components are generally disposed on opposite sides of an intervening component or space, although not necessarily in a symmetrical configuration. Thus, the two "opposed" components may be slightly offset with respect to one another.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A bracket assembly for securing a safety equipment module to a windowpane of a vehicle, the bracket assembly comprising:
   a planar bracket member having an interior surface and an exterior surface adapted to be secured to an interior surface of the windowpane with a top portion of the planar bracket member disposed relatively closer to a top portion of the windowpane and a bottom portion of the planar bracket member disposed relatively closer to a bottom portion of the windowpane;
   a clip structure coupled to a top, central portion of the interior surface of the planar bracket member and adapted to receive and retain a post structure coupled to the safety equipment module, wherein the clip structure defines an opening in a bottom portion thereof adapted to receive the post structure as the post structure is translated into the clip structure in a direction corresponding to the bottom portion of the planar bracket member towards the top portion of the planar bracket member; and
   a pair of opposed retention structures each coupled to a bottom, side portion of the interior surface of the planar bracket member and adapted to receive and retain a pair of opposed post or hook structures coupled to the safety equipment module, wherein each of the opposed retention structures defines an opening in an interior portion thereof adapted to receive an associated post or hook structure as the post or hook structure is translated into an associated opposed retention structure first in a direction corresponding to the interior surface of the planar bracket member towards the exterior surface of the planar bracket member and second in a direction corresponding to the top portion of the planar bracket member towards the bottom portion of the planar bracket member.

2. The bracket assembly of claim 1, wherein the exterior surface of the planar bracket member is adapted to be secured to the interior surface of the windowpane using an adhesive.

3. The bracket assembly of claim 1, wherein the clip structure comprises a resilient spring member adapted to retain the post structure coupled to the safety equipment module and bias the post structure towards the planar bracket member and the interior surface of the windowpane.

4. The bracket assembly of claim 1, wherein the clip structure comprises a pair of opposed strut structures adapted to align the post structure coupled to the safety equipment module with respect to the planar bracket member.

5. The bracket assembly of claim 1, wherein each of the pair of opposed retention structures comprises a resilient spring member adapted to bias the associated post or hook structure coupled to the safety equipment module away from the planar bracket member and the interior surface of the windowpane and into a lip structure of a bottom portion of the retention structure.

6. The bracket assembly of claim 1, wherein the bracket member defines a recess adapted to align the post structure coupled to the safety equipment module with respect to the planar bracket member.

7. The bracket assembly of claim 1, where the post structure is coupled to a top, central portion of the safety equipment module.

8. The bracket assembly of claim 1, where each of the pair of opposed post or hook structures is coupled to a side portion of the safety equipment module.

9. A windshield assembly for a vehicle, the windshield assembly comprising:
    a windowpane having an interior surface;
    a planar bracket member having an interior surface and an exterior surface secured to the interior surface of the windowpane with a top portion of the planar bracket member disposed relatively closer to a top portion of the windowpane and a bottom portion of the planar bracket member disposed relatively closer to a bottom portion of the windowpane;
    a clip structure coupled to a top, central portion of the interior surface of the planar bracket member and adapted to receive and retain a post structure coupled to the safety equipment module, wherein the clip structure defines an opening in a bottom portion thereof adapted to receive the post structure as the post structure is translated into the clip structure in a direction corresponding to the bottom portion of the planar bracket member towards the top portion of the planar bracket member; and
    a pair of opposed retention structures each coupled to a bottom, side portion of the interior surface of the planar bracket member and adapted to receive and retain a pair of opposed post or hook structures coupled to the safety equipment module, wherein each of the opposed retention structures defines an opening in an interior portion thereof adapted to receive an associated post or hook structure as the post or hook structure is translated into an associated opposed retention structure first in a direction corresponding to the interior surface of the planar bracket member towards the exterior surface of the planar bracket member and second in a direction corresponding to the top portion of the planar bracket member towards the bottom portion of the planar bracket member.

10. The windshield assembly of claim 9, wherein the exterior surface of the planar bracket member is secured to the interior surface of the windowpane using an adhesive.

11. The windshield assembly of claim 9, wherein the clip structure comprises a resilient spring member adapted to retain the post structure coupled to the safety equipment module and bias the post structure towards the planar bracket member and the interior surface of the windowpane.

12. The windshield assembly of claim 9, wherein the clip structure comprises a pair of opposed strut structures adapted to align the post structure coupled to the safety equipment module with respect to the planar bracket member.

13. The windshield assembly of claim 9, wherein each of the pair of opposed retention structures comprises a resilient spring member adapted to bias the associated post or hook structure coupled to the safety equipment module away from the planar bracket member and the interior surface of the windowpane and into a lip structure of a bottom portion of the retention structure.

14. The windshield assembly of claim 9, wherein the bracket member defines a recess adapted to align the post structure coupled to the safety equipment module with respect to the planar bracket member.

15. The windshield assembly of claim 9, where the post structure is coupled to a top, central portion of the safety equipment module.

16. The windshield assembly of claim 9, where each of the pair of opposed post or hook structures is coupled to a side portion of the safety equipment module.

17. A safety equipment module adapted to be secured to a windowpane of a vehicle, the safety equipment module comprising:
    a housing;
    a post structure coupled to the housing and adapted to be received and retained by a clip structure coupled to a top, central portion of an interior surface of a planar bracket member secured to an interior surface of the windowpane, wherein the post structure is coupled to a top, central portion of the housing, and wherein the clip structure defines an opening in a bottom portion thereof adapted to receive the post structure as the post structure is translated into the clip structure in a direction corresponding to a bottom portion of the planar bracket member towards a top portion of the planar bracket member; and
    a pair of opposed post or hook structures coupled to the housing and adapted to be received and retained by a pair of opposed retention structures each coupled to a bottom, side portion of the interior surface of the planar bracket member adapted to be secured to the interior surface of the windowpane, wherein each of the pair of opposed post or hook structures is coupled to a bottom, side portion of the housing, and wherein each of the opposed retention structures defines an opening in an interior portion thereof adapted to receive an associated post or hook structure as the post or hook structure is translated into an associated opposed retention structure first in a direction corresponding to the interior surface of the planar bracket member towards an exterior surface of the planar bracket member and second in a direction corresponding to the top portion of the planar bracket member towards the bottom portion of the planar bracket member.

18. The safety equipment module of claim 17, further comprising one or more of a camera device and a sensor device disposed within the housing.

* * * * *